United States Patent
Broussard et al.

(10) Patent No.: US 6,317,776 B1
(45) Date of Patent: Nov. 13, 2001

(54) METHOD AND APPARATUS FOR AUTOMATIC CHAT ROOM SOURCE SELECTION BASED ON FILTERED AUDIO INPUT AMPLITUDE OF ASSOCIATED DATA STREAMS

(75) Inventors: Scott J. Broussard, Cedar Park; Leslie R. Wilson, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,909

(22) Filed: Dec. 17, 1998

(51) Int. Cl.[7] .................................................. G06F 13/00
(52) U.S. Cl. ..................... 709/204; 709/207; 709/246; 709/329
(58) Field of Search .................................. 709/204, 205, 709/206, 207, 217, 223, 224, 227, 228, 238, 313, 328, 329, 247, 246

(56) References Cited

U.S. PATENT DOCUMENTS 4,965,819 * 10/1990 Kannes .................................. 348/15
5,392,223    2/1995 Caci ..................................... 709/218
5,623,312 *  4/1997 Yan et al. ............................ 348/416
5,745,380 *  4/1998 Sandvoss et al. ................. 379/90.01

* cited by examiner

*Primary Examiner*—Viet D. Vu
(74) *Attorney, Agent, or Firm*—Morgan & Finnegan, LLP

(57) ABSTRACT

An apparatus and method as shown automatically selects a video stream of a video-conference for transmission or display. The apparatus and method includes a receiving step for receiving video and audio streams over a network from participants in a video-conference. Each of the audio streams each has amplitude data. A suppressing step suppresses some of either the first or second video stream based on the amplitude data of the corresponding audio stream. The video stream or streams that are not suppressed are either displayed on a display screen of a participant of the video conference or transmitted to other terminals for display on display screens.

20 Claims, 4 Drawing Sheets

METHOD AND APPARATUS FOR AUTOMATIC CHAT ROOM SOURCE SELECTION BASED ON FILTERED AUDIO INPUT AMPLITUDE OF ASSOCIATED DATA STREAMS

FIELD OF THE INVENTION

The present invention relates to the field of video telecommunications. In particular, the invention relates to video telecommunications between a plurality of conferees, each producing an output video stream and an output audio stream. The video stream selected for display to the conferees is based on characteristics of the output audio streams.

BACKGROUND OF THE INVENTION

With the recent proliferation of inexpensive, powerful computer technology, methods of communication have progressed significantly. The ordinary voice telephone call, an efficient communication technique, is now accompanied by efficient and widely-used alternatives such as electronic mail and on-line chat rooms which allow participants to convey text, images and other data to each other over computer networks.

Video conferencing is another technique for communication which allows participants to convey both sound and video in real time to each other over computer networks. Video conferencing has, in the past, been cost prohibitive for individuals and corporations to put into wide-spread use. Recently, however, technology has progressed such that video conferencing technology is available, at a reasonable cost, for implementation at terminals such as a desktop or portable computer or hand-held communications device.

Video-conferencing terminals are typically equipped with a video camera and a microphone for respectively capturing, in real-time, video images and sound from participants of the video-conference. The terminals also typically include a display and a speaker for playing the video images and sound in real time to the participants. When a video conference has two participants, it is called a point-to-point conference. Typically, in this arrangement, each terminal will capture video and sound from the participant stationed at the terminal and will transmit the captured video and audio streams to the other terminal. Each terminal will also play the video and audio streams received from the other terminal on the display and speakers respectively of the terminal.

When a video conference has more than two participants, it is called a multi-point videoconference. Typically, in this arrangement, each terminal will capture video and sound from the participant stationed at the terminal. Subsequently, the captured video and audio streams will be transmitted either directly or indirectly to the other terminals. Each terminal will then display one or more video streams and play the audio streams from the other participants.

There are several problems to confront in multi-point video conferencing. The first is how to allocate the limited area of a terminal's display screen to each of several video streams. There are different ways of doing this. One way is to allocate a fixed area on the display screen for video and divide this area between the video streams from two or more conference participants. This technique of dividing a fixed area, also called "mixing" of video streams, unfortunately results in reduced resolution of the displayed images within each video stream. This problem is particularly acute when a terminal has only a small display area to begin with, such as when the terminal is a hand-held communications device.

Another way to allocate area on the display screen is to allocate a fixed size viewing area to the video stream from each participant. Using this technique, in a video conference involving four participants, the display of each terminal would include three fixed-size areas, each fixed-size area being devoted to one of the participants. The problem with multiple, fixed-size viewing areas, however, is that the area required for a particular number of participants may exceed that which is available on the display screen.

The above problems may be characterized as display screen "real-estate" problems. Still another technique for solving the display screen "real-estate" problem involves providing a participant with the ability to manually turn off certain video streams. This technique has the disadvantage of requiring manual intervention by the conference participant.

Additional problems to confront in multi-point video-conferencing concern the large volume of video and sound data which must be processed and transmitted between the terminals. Terminals are typically coupled together over packet switched networks, such as a local area network (LAN), a wide area network (WAN) or the Internet. Packet switched networks have limited amounts of bandwidth available. The available bandwidth may quickly be exceeded by the video and audio stream data produced by participants in a multi-point video conference.

Moreover, once the video and audio streams arrive at a terminal, the terminal must process the data prior to playing it on the display and speaker. Processing multiple video streams by "mixing" the streams or by allocating a fixed area to each video stream is demanding of the terminal's processing capability. The processing capability of a terminal may quickly be exceeded by having to process more than one video stream for display. In this event, the video and audio streams may become distorted or cease to be played by the terminal.

There is a need for an automatic mechanism to control the transmission and display of video-conferencing data. The automatic mechanism should select meaningful video streams for transmission and display to the other terminals. By the same token, the automatic mechanism should throttle-back video streams that do not contain meaningful content so that these video streams need not be transmitted and processed.

SUMMARY OF THE INVENTION

According to the present invention, a method automatically selects a video stream of a video-conference for transmission or display. The method includes a receiving step for receiving video and audio streams over a network from participants in a video-conference. Each of the audio streams each has amplitude data. A suppressing step suppresses some of either the first or second video stream based on the amplitude data of the corresponding audio stream. The video stream or streams that are not suppressed are either displayed on a display screen of a participant of the video conference or transmitted to other terminals for display on display screens.

In a preferred embodiment of the invention, the suppressing step includes the steps of comparing the amplitude data of each audio stream with the amplitude data of each other audio stream and suppressing all video streams except for that which corresponds to the audio stream with the maximum level. In the preferred embodiment, the terminals participating in a multi-point video conference only display one video on the display screen at a time. The displayed video is switched among the video streams of the various conference participants in a time interleaved manner automatically based on the volume or amplitude of the sound picked up by each participant's microphone.

The method may be implemented at a terminal which participates in multi-point video conference, either in a unicast or broadcast network configuration (shown respectively in FIGS. 2 and 3). In this implementation, the suppression of certain video streams results in reduced processing load on the terminal, which displays only the non suppressed video stream or streams. Conversely, the method may be implemented at a conference controller in videoconference which uses a broadcast configuration. In this implementation, the suppression of certain video streams results in fewer video streams being transmitted from the conference controller to the terminals participating in the video-conference. This results in a saving of network bandwidth.

An apparatus according to the present invention automatically selects a video stream of a video-conference for transmission or display. The apparatus includes a source of video and audio streams corresponding respectively to first and second participants of a video conference. The apparatus further includes a network interface and a processor. The network interface exchanges video frames with the network. The processor receives the video and audio streams and suppresses one of the video streams based on amplitude data of the corresponding audio stream.

BRIEF DESCRIPTION OF THE FIGURES

The above described features and advantages of the present invention will be more fully appreciated with reference to the appended figures and detailed description.

DETAILED DESCRIPTION OF THE INVENTION

Figure 1:
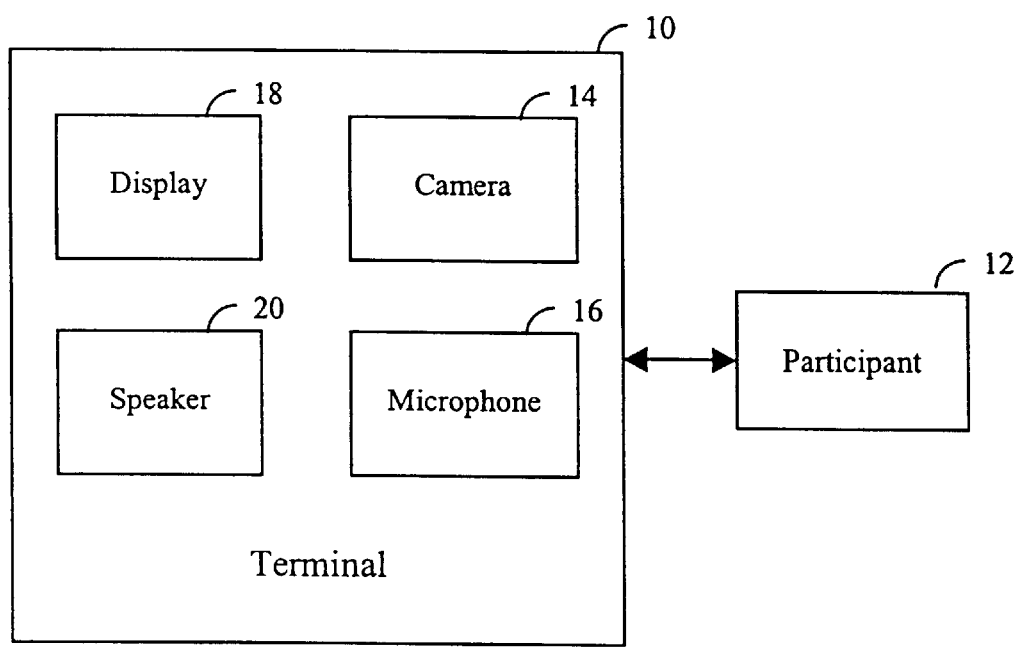
FIG. 1 depicts a block diagram of a conventional video conferencing terminal.

FIG. 1 depicts a block diagram of a conventional video conferencing terminal 10, which is used by a participant 12 so that the participant 12 may participate in a video conference. The terminal 10 includes a camera 14 and a microphone 16 for capturing, respectively, video and sound from the participant 12. The terminal 10 also includes a display 18 and a speaker 20 for playing, respectively, video and sound from a video conference to the participant 12. The terminal 10 is also coupled to a network 22. The network 22 is typically a packetized network such as a local area network, a wide area network, or the Internet.

During a video conference, the terminal 10 sends a video and an audio stream over the network 22 to other terminals belonging to participants participating in a video conference. The network 22 is typically a IP network. Video and audio stream data are broken up into packets of information at the terminal 10 and are transmitted over the network 22 to other terminals in a well known manner. The packets at the receiving terminal are then received, reordered where appropriate, and played for the participant at the receiving terminal 10. The protocol used for transmission may be the TCP protocol, which is a reliable protocol. However, preferably, the protocol is a UDP protocol, which is a protocol for the transmission of unreliable data, with quick delivery. Preferably, packets are transmitted pursuant to the RTP/RTCP protocols. These protocols are UDP type protocols.

Figure 2:
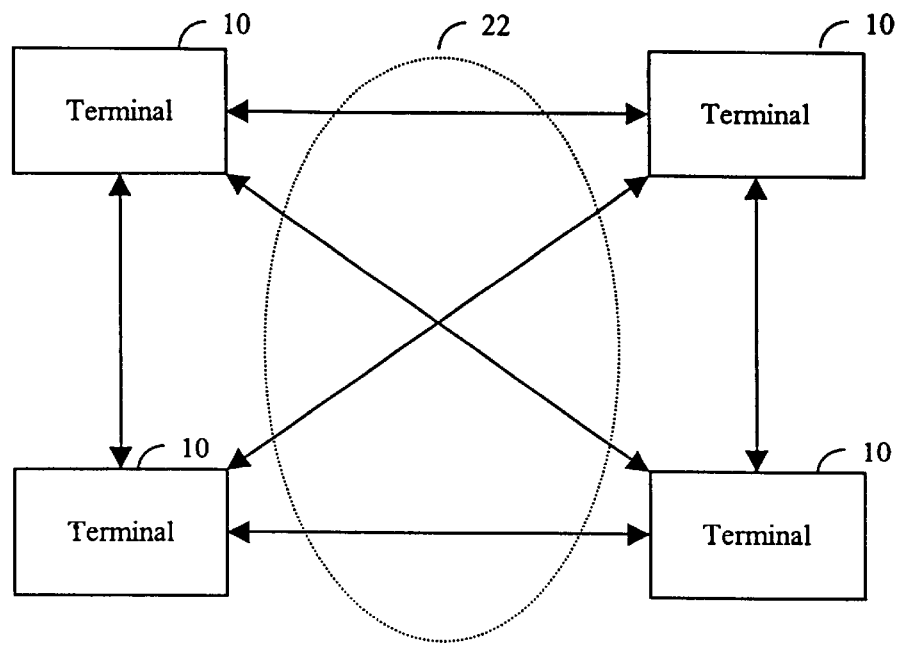
FIG. 2 depicts a conventional multi-point video conference involving 4 terminals interconnected in a point-to-point configuration.
Figure 3:
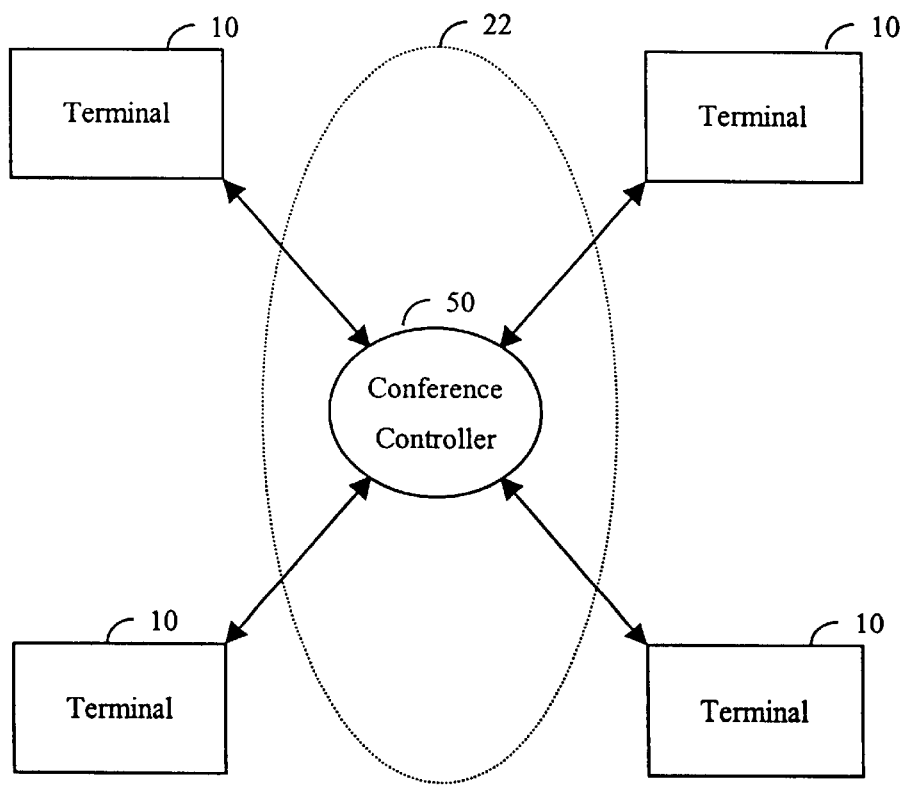
FIG. 3 depicts a conventional multi-point video conference involving 4 terminals interconnected in a broadcast configuration.

When a conference has two participants, it is called a point-to-point conference. When a conference has more than two participants, it is called a multi-point video conference. FIGS. 2 and 3 depict different schemes for interconnecting terminals 10 that are participating in a multi-point video conference over a network 22. FIG. 2 depicts a peer-to-peer arrangement for video conferencing. In a peer-to-peer arrangement, each terminal transmits video and audio streams to each other terminal 10. Similarly, each terminal 10 receives video and audio stream data from each other terminal 10. When a large number of participants participate in a video conference, a peer-to-peer arrangement can result in an unmanageable proliferation of data being transferred over the network 22, resulting in degraded quality of the audio and video streams received by and played at the terminals 10.

FIG. 3 depicts another multi-point video conference arrangement called a broadcast connection. In the broadcast connection, each terminal 10 exchanges data with a conference controller 50 over the network 22. The conference controller 50 is typically a server which receives packetized data over the network and routes packetized data over the network to another terminal 10. During a video conference, the conference controller 50 receives video and audio streams from each terminal 10. The video and audio stream data received from each terminal 10 is packetized data, where each packet of data includes a conference identifier. The conference identifier is used by the conference controller 50 to route the received audio and video streams to the other terminals 10 participating in the conference identified by the video conference identifier. The broadcast technique generally makes more efficient use of network bandwidth when a multi-point video conference.

Figure 4:
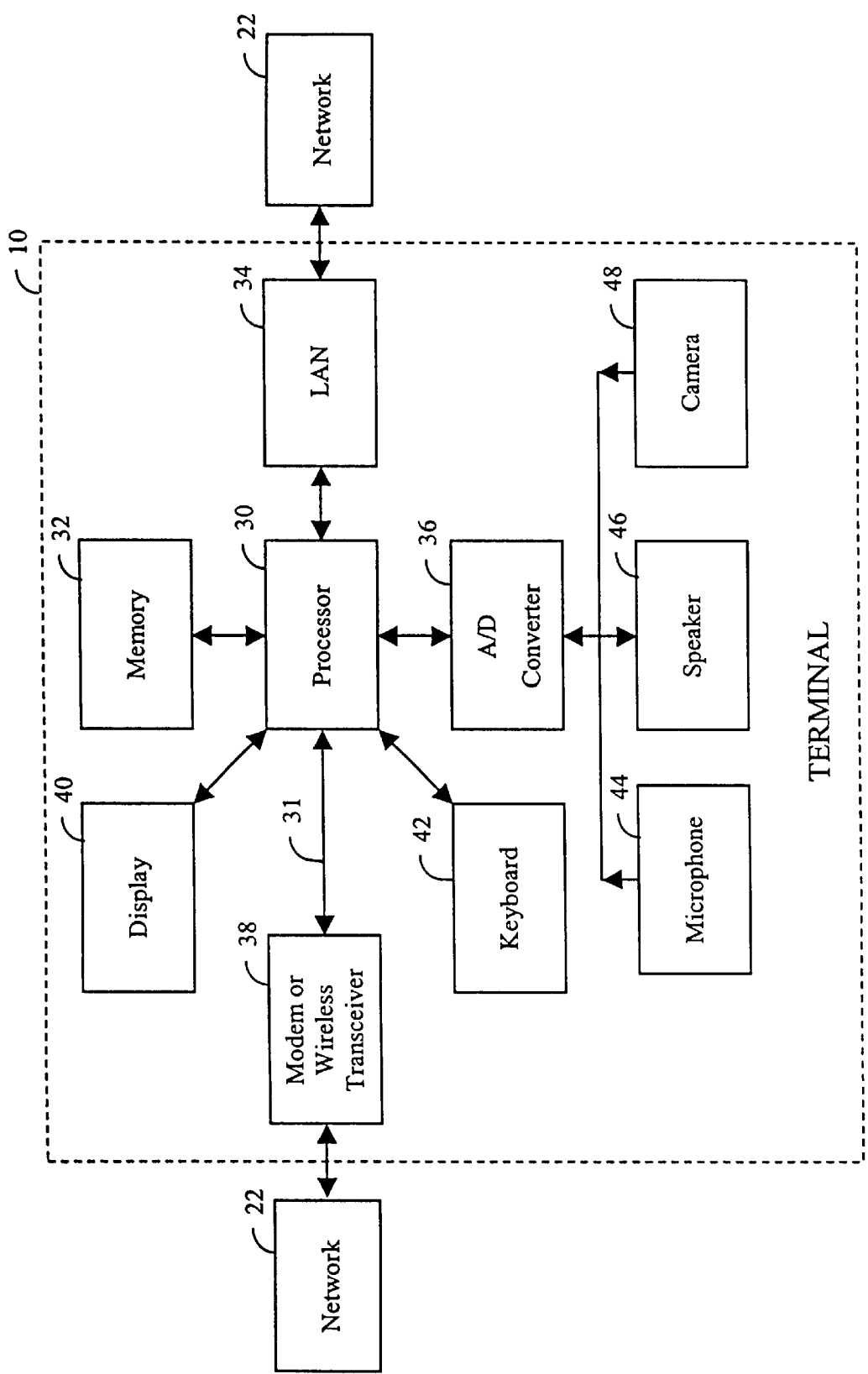
FIG. 4 depicts an internal view of a video-conferencing terminal according to the present invention.

FIG. 4 depicts the functional blocks within a terminal 10. The terminal 10 includes a processor 30 which is connected over a bus 31 to a local area network (LAN) interface 34, a memory 32, an analog-to-digital (A/D) and digital-to-analog (D/A) converter 36, a modem 38, a display 40, and a keyboard 42. The memory 32 may include read only memory (ROM), random access memory (RAM), hard disk drives, tape drives, floppy drives, and any other device capable of storing information. The memory 32 stores data and application program instructions which are used by the processor 30 to provide functionality to the terminal 10. The LAN interface 34 is coupled to the bus 31 and the network 22.

The LAN interface 34 receives video and audio stream data from the processor bus 31, packetizes the video and audio stream data, and transmits the packetized data to the network 22. The packetized data may be transmitted using a plurality of protocols including RTP, RTSP, H.323 among others. The LAN interface 34 may also transmit packets pursuant to a control protocol, such as RTCP. The packets exchanged between a terminal 10 and the network 22 pursuant to a control protocol illustratively include information concerning joining and leaving a conference, membership in a videoconference (or chat room), bandwidth allocations to various connections and paths between terminals 10, and network performance. The LAN interface 34 also receives video and audio stream data in packetized form from the network 22. The LAN interface 34 translates the received packets into data usable by the processor 30 and places the translated data onto the processor bus 31. In addition, the LAN interface 34 may perform functions such as data compression prior to packetized transmission in order to conserve network 22 bandwidth.

An A/D, D/A converter 36 is coupled in a conventional manner between the processor bus 31 and a microphone 44, a speaker 46 and a camera 48. The A/D, D/A converter 36 converts data from the bus 31, which is in a digital format, to an analog format for use with the microphone 44, the speaker 46 and the camera 48 and vice versa. The digital data transmitted to the bus 31 is typically in a pulse code modulated (PCM) data format. The PCM data may be 8 or 16 bit PCM data or any other convenient PCM data format. Data received by the A/D, D/A converter 36 from the microphone 44 is an analog signal representing sound waves received by the microphone 44. The A/D, D/A converter samples the sound signal at a predetermined rate, for example, 11, 22, 44, 56 or 64 kHz, and converts the sample signal into PCM data for transmission to the bus 31. Each sample has an audio level associated with it and collectively, the sampled levels are a digitized representation of the sound received by the microphone 44 called the audio stream. Similarly, the camera 48 produces a signal based on the images sensed by the camera. Typically, the camera with be trained on a participant in the video conference. The video signal is then converted by the A/D, D/A converter 36 into a format suitable for processing by the processor 30, such as RGB or YUV. The speaker 46, coupled to the A/D, D/A converter, produces sound for a participant at the terminal 10. The A/D, D/A converter 36 receives pulse code modulated (PCM) data representing an audio stream from the bus 31. The A/D, D/A converter converts the PCM data to a sound signal which is sent to speaker 46. The speaker 46 then expands and rarefies air in response to the sound signal to produce sound audible by the participant at the terminal 10.

The display 40 is coupled to the bus 31. The display 40 displays, among other things, video from the packetized video stream received from the network 22. The keyboard 42 is coupled to the processor 30 over bus 31 and behaves in a conventional manner to allow input of data to the terminal 10.

The terminal 10 is typically configured to have video conferencing software resident in memory 32. The video conferencing software includes a plurality of instructions which are executed by the processor 30. These instructions are followed by the processor 30 to provide video conferencing in a conventional manner. A widely used video conferencing program is CU-SeeMe. CU-SeeMe, as well as other well-known video conferencing software applications, causes a processor 30 to process video and audio stream data and exchange the data between the network 22 and the display 40, keyboard 42, microphone 44, speaker 46 and camera 48 of the terminal over the bus 31 in a conventional manner. In addition, video conferencing software, such as CU-SeeMe, exchanges data with a packetized network 22 in a conventional manner, such as by using the h.323 video conferencing protocol. In addition to h.323, any other suitable protocol may be used for exchanging audio and video stream data with the network 22. Other examples include the real-time transport protocol (RTP), the real-time streaming protocol (RTSP) among others. The terminal 10 may also include a modem and wireless transceiver 38, coupled to the bus 31. The wireless transceiver 38 may also be coupled to the network 22. In this event, the wireless transceiver may include an antenna for exchanging video and audio stream data with a cellular network pursuant to a protocol such as CDPD or H.324. Typically, in this configuration, the terminal 10 will be a handheld communications or computing device or portable computer.

Figure 5:
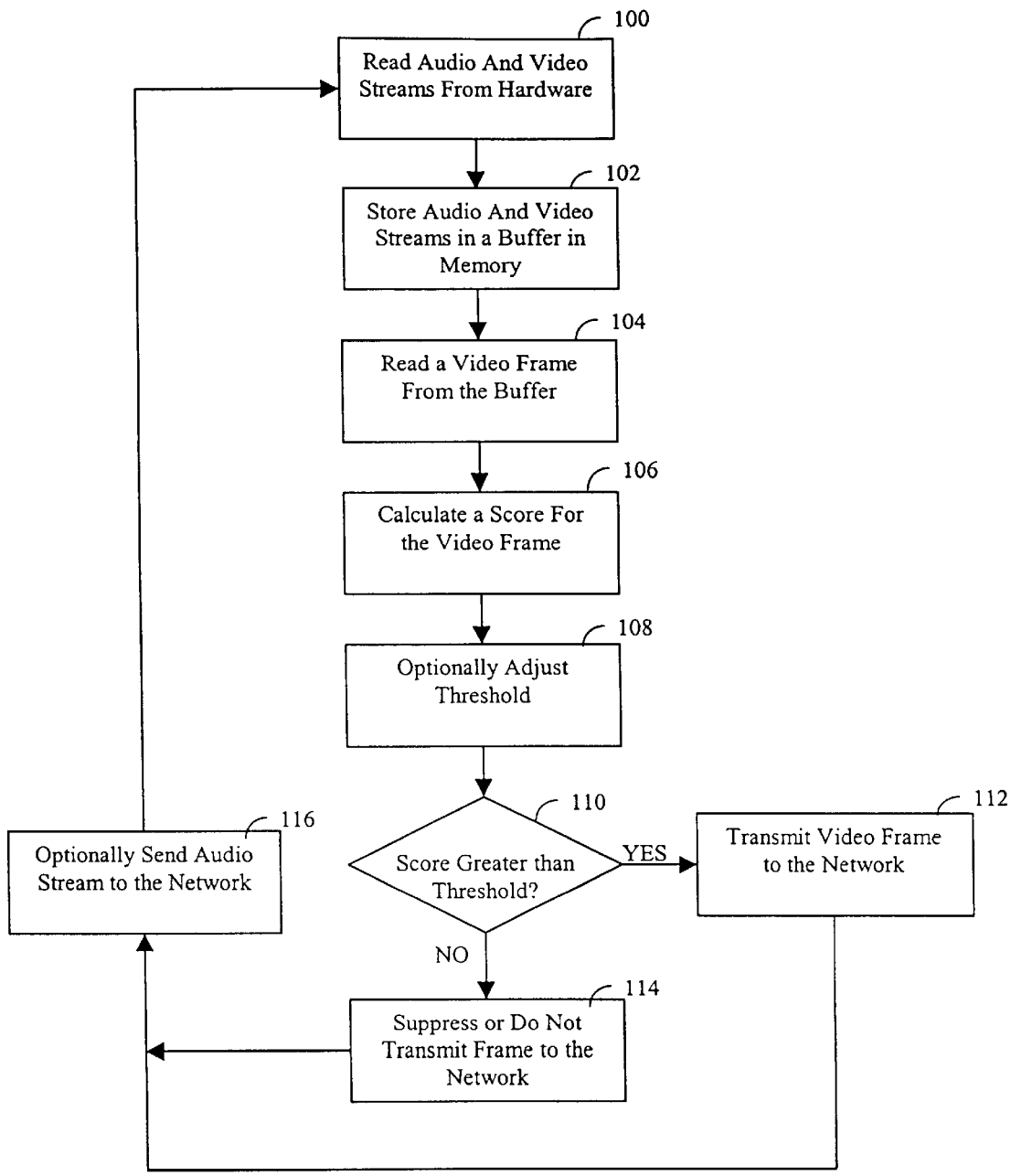
FIG. 5 depicts a method of selecting a video stream for transmission or display according to the present invention.

FIG. 5 depicts a method of receiving and processing audio and video streams from a network 22. The method steps depicted in FIG. 5, in practice, would be represented as software instructions resident in memory 32 of terminal 10. The processor 30 would then execute the method steps depicted in FIG. 5.

In step 100, the processor 30 receives audio and video streams and stores them in a buffer. The buffer is typically part of the memory 32. The audio and video streams received in step 100 may be audio and video streams received over the network 22. In this case, the audio and video streams are destined for playing on the display 40 and speaker 46 respectively of the terminal 10. Moreover, there may be an intermediate step of converting the received audio and video streams from a first format, such as packets of data in h.323 format, to a second format that is conveniently manipulated by the processor 30. The audio and video streams received by the processor 30 in step 100, by contrast, may have been produced by the microphone 44 and camera 48, respectively, of terminal 10. In this event, the audio and video streams are destined for other terminals 10 that are coupled to the network 22 and belong to participants of the video conference. Typically, the audio and video streams produced in this manner are converted from raw audio and video signals to PCM data by the A/D, D/A converter 36. The PCM data is subsequently stored in a buffer in memory 32.

In step 102, the processor 30 selects a particular audio stream for processing. In step 104, the processor 30 reads the selected audio stream data from the buffer in memory 32. The selected audio stream is then converted into a common mix format. Step 104 is important, because audio streams received may have different characteristics. For example, different audio streams may have been sampled at a different sampling rate. The conversion into a common mix format is done to eliminate this type of difference from the audio streams for purposes of subsequent processing.

In step 106, the audio stream data is filtered to reject sound outside of the human voice range. This step is optional and is performed when the emphasis of a video conference is on conveying speech through the audio channel of the video conference. However, it is contemplated that other types of sounds may be desirable for transmission over the audio stream of a video conference to conference participates. In the latter scenario, it may be undesirable to reject sounds outside of the human voice range in step 106.

In step 108, additional filtering is performed on the audio stream that has been selected for processing. The filtering in step 108 is designed to filter out noise spikes such as may occur when an object strikes the floor and makes a loud noise.

In step 110, the processor 130 determines a time averaged, unamplified audio level for the selected audio stream. The time averaged audio level represents the average amplitude of the sound or volume of the sound represented by the audio stream. Any suitable algorithm may be used for the time averaged unamplified audio level over a suitably long period of time, for example, 10 seconds to 2 minutes, preferably 1 minute. The following formula is an example:

newlevel=A * newlevel+B * sampledlevel

In the above formula, newlevel represents the unamplified time averaged audio level. Sampledlevel represents the amplitude or audio level of sound present during a moment of time stored as a value in the buffer in the memory 32. A series of sampledlevel values represents the digitized stream of sound captured by the microphone of a participant 12 of the video conference. A and B are typically constants that when added together equal 1. Their values are chosen to reflect the rate of change of the time-averaged, unamplified audio level in response to the most recent samples of the audio stream. For example, if A is zero, and B is one, then at any given stage of processing, newlevel will equal the presently sampled level. By contrast, if A is 1 and B is 0, newlevel will always be 0, because the most recent samples in the audio stream will be discarded. Preferably, A is between 0.5 and 1 and B is between 0 and 0.5. Most preferably, A is 0.8 and B is 0.2.

In practice, the choice of constants A and B will affect the selection of a video stream for display in a multi-point video conference. In particular, the choice of A and B will affect the speed of transitions between video streams for display when there is a succession in speaking amongst the participants of the video conference. For example, if there are four participants in a multi-point video conference, and participant 1 speaks first, then participant 2, then participant 3, and then participant 4, the display screen of the terminal belonging to the second participant will behave as follows. First, the video stream of participant 1 will be displayed because the audio level will be maximum for participant 1's audio stream. When participant 2 speaks, and participant 1 ceases to speak, the display screen of participant 2's terminal will continue to display the video stream of participant 1 because participant 2's display screen will not display the video screen produced by participant 2. However, this could be changed such that participant 2's video stream is displayed at participant 2's terminal when participant 2 speaks. When participant 3 speaks, the video stream selected for display corresponds to the video stream of participant 3. The speed of transition between the displayed video streams of participants 2 and 3 (or 1 and 3) is determined by the value of the constants A and B. Similarly, when participant 4 speaks, there is a transition between participant 3's video stream and participants 4's video stream. Again, this transition and specifically the speed thereof is determined based on the values of coefficients A and B. Ideally, A and B are selected to avoid the problem of having very fast switching between the video streams of participants who speak simultaneously and at varying volume levels.

In step 112, the audio level of a selected audio stream is normalized relative to all of the audio streams. This step is performed using conventional techniques, such as using the time-averaged audio level of each stream to scale each stream so that they are within the same range. Step 112 may be implemented to account for differences between the volume of the voices of different participants in the video conference, as well as environmental factors such as the distance that each participant sits from his microphone and the sensitivity of a participant's microphone.

In step 114, the processor 30 stores the normalized audio level of the selected stream.

In step 116, the processor determines if there are any additional streams for processing. If so, then in step 102, the processor 30 selects a new audio stream for processing. If not, then either step 117 or step 118 begins. Step 117 may be chosen instead of step 118 if one desires to have more than one video stream appear on the display screen at any given time. Step 118 is chosen if the participant desires to have only one video stream displayed on his display screen at any given time with the selection of the video stream being based upon the amplitude of the audio stream. In step 117, the processor 30 determines whether any of the received audio streams have an normalized audio level that exceeds a predetermined threshold. In step 118, by contrast, the processor 30 determines which audio stream has the maximum normalized audio level. Step 120 may be reached either from step 117 or step 118. When step 120 is reached from step 117, the processor 30 identifies all of the video streams corresponding to audio streams which were found to exceed the predetermined threshold in step 117. If step 120 is reached from step 118, the processor 30 identifies the video stream corresponding to the audio stream which was determined to have the maximum level.

In step 122, the processor suppresses all video streams which were not identified in step 120. In step 124, the processor 30 sends display data corresponding to the video stream or streams identified in step 120 over the bus 31 to the display 40 for display. In this manner, the video stream displayed on the display 40 is interleaved among the video conference participants in a time interleaved manner. Depending upon the choice of implementing step 117 or step 118, either one or more video streams will be displayed on the display 40 when one or more participants audio level is greater than a predetermined threshold or a single video will appear on the display screen which will be switched between the conference participants based on which participant is speaking.

In step 126, the processor 30 mixes the audio streams into a single mixed stream. Then in step 128, the processor sends data corresponding to the mixed audio stream to the A/D, D/A converter 36 which in turn converts the data to an analog signal for playing over the speaker 46. In this manner, even though only one or a few video streams are displayed on the display 40, all of the audio streams of the participants are presented to the speaker 46 for presentation to each participant.

Although specific embodiments of the present invention have been disclosed, one of ordinary skill in the art will appreciate that changes may be made to those embodiments without departing from the spirit and scope of the invention. For example, although the invention has been described in terms of a terminal selecting a video stream for display on the display screen of the terminal itself, the invention may also be applied at a conference controller 50 operating in a broadcast configuration. In this implementation, the conference controller 50 would process audio and video streams exactly as described in method steps 100–126. However, when the video stream is suppressed in step in step 122, the video streams are no longer transmitted from the conference controller 50 to the other terminals of the video conference. This results in substantial savings of network 22 bandwidth. Similarly, in step 128, the video stream selected is transmitted from the conference controller over the network 22 to the terminals participating in the video conference.

What is claimed is:

1. A method for automatically selecting a video stream of a video-conference for transmission or display, comprising the steps of:

receiving first and second video and audio streams respectively corresponding to first and second participants in a video-conference, said audio streams each having amplitude data;

suppressing one of the first or second video stream based on the amplitude data of the corresponding audio stream.

2. The method according to claim 1, wherein the receiving and suppressing steps are performed by a conference controller coupled over a network to a plurality of terminals, wherein first and second of the plurality of terminals respectively transmit the first and second video streams to the conference controller.

3. The method according to claim 1, wherein the receiving and suppressing steps are performed by a terminal coupled to a network.

4. The method according to claim 3, wherein the terminal further comprises a display screen and the suppressing step causes the suppressed video stream not to be displayed on the display screen.

5. The method according to claim 1, wherein the suppressing step is performed when the amplitude data, corresponding to one of the audio streams, has a value which falls below a predetermined threshold.

6. The method of claim 5, further comprising the step of receiving a third video and audio stream respectively corresponding to a third participant of the video-conference; wherein the suppressing step suppresses one of the first, second and third video streams.

7. The method according to claim 5, further comprising the step of receiving a third video and audio stream respectively corresponding to a third participant of the video-conference; wherein the suppressing step suppresses two of the first, second and third video streams.

8. The method according to claim 1, wherein the suppressing step comprises the steps of:
   comparing the amplitude data of the first audio stream with the amplitude data of the second audio stream; and
   selecting for suppressing the video stream corresponding to the audio stream that has amplitude data with a lower value.

9. The method according to claim 8, further comprises the step of receiving third video and audio streams respectively corresponding to a third participant of the video-conference;
   wherein the suppressing step suppresses two of the first, second and third video streams.

10. The method according to claim 1, further comprising the step of:
    mixing the first and second audio streams;
    playing the mixed audio streams to the participants.

11. An apparatus for automatically selecting a video stream of a video-conference for transmission or display, comprising:
    a source of first and second video and audio streams corresponding respectively to first and second participants of a video conference;
    a network interface for exchanging video frames with the network; and
    a processor, coupled to the source and the network interface, the processor receiving the first and second video and audio streams, each of said audio streams having amplitude data and the processor suppressing one of the first or second video streams based on the amplitude data of the corresponding audio stream.

12. The apparatus according to claim 11, wherein the apparatus is a conference controller coupled through the network interface to a plurality of terminals on the network, wherein first and second of the plurality of terminals respectively transmit the first and second video and audio streams to the conference controller.

13. The apparatus according to claim 11, wherein the apparatus is a hand-held computer coupled to the network through the network interface.

14. The apparatus according to claim 13, wherein the network interface has a wireless connection to the network.

15. The apparatus according to claim 11, further comprising a display screen and wherein the suppressing of the processor causes the suppressed video stream not to be displayed on the display screen.

16. The apparatus according to claim 11, wherein the processor suppresses one of the first and the second video streams when the amplitude data of the corresponding audio stream, has a value which falls below a predetermined threshold.

17. The apparatus according to claim 11, wherein the processor receives a third video and audio stream respectively corresponding to a third participant of the video-conference and the processor suppresses one of the first, second and third video streams based on the amplitude data of the corresponding audio streams.

18. The apparatus according to claim 11, wherein the processor receives a third video and audio stream respectively corresponding to a third participant of the video-conference and the processor suppresses two of the first, second and third video streams based on the amplitude data of the corresponding audio streams.

19. A computer program product for automatically limiting the transmission of a video stream from a computer participating in a video conference to a network, comprising:
    a computer useable medium having computer program logic stored therein, wherein the computer program logic comprises:
    receiving means for causing the computer to receive first and second video and audio streams respectively corresponding to first and second participants in a video-conference, said audio streams each having amplitude data; and
    suppressing means for causing the computer to suppress one of the first or second video stream based on the amplitude data of the corresponding audio stream.

20. The computer program product according to claim 19, wherein the computer has a display screen and the suppressing means causes the suppressed video stream not to be displayed on the display screen.

* * * * *